United States Patent [19]
Akazawa

[11] 3,713,992
[45] Jan. 30, 1973

[54] GLASS ELECTRODE FOR DETERMINING PH VALUE AT SUPER HIGH TEMPERATURES

[76] Inventor: Tsugio Akazawa, 18-17, Takaido-Nishi 1-chome, Suginami-ku, Tokyo, Japan

[22] Filed: March 11, 1970

[21] Appl. No.: 18,496

[30] Foreign Application Priority Data

March 15, 1969 Japan..............................44/19255

[52] U.S. Cl...................204/1 T, 204/195 G, 65/66
[51] Int. Cl..............................................G01n 27/36
[58] Field of Search.............................204/1 T, 195

[56] References Cited

UNITED STATES PATENTS 2,444,845   7/1948   Perley.................................204/195
3,410,777   11/1968  Ross....................................204/195
3,433,749   3/1969   Nishimoto et al.....................204/195
3,451,830   6/1969   Nishimoto et al.....................204/195

*Primary Examiner*—T. Tung
*Attorney*—Robert E. Burns and Emmanuel J. Lobato

[57] ABSTRACT

A glass electrode used for determining pH-values particularly at elevated temperatures, the active part of which is formed of a glass membrane composed of a glass that comprises as essential constituents 50-70 percent $SiO_2$, 10-20 percent $Li_2O$, 7-20 percent $BaO$, and 3-10 percent $UO_3$, and also 0-5 percent of an oxide or oxides selected from the group consisting of $NiO$, $Nd_2O_3$, $La_2O_3$, $Cr_2O_3$, $ThO_2$, $ZrO_2$, $TiO_2$, $MnO_2$, $Co_3O_4$, $Ta_2O_5$, and $Nb_2O_5$.

6 Claims, 7 Drawing Figures

GLASS ELECTRODE FOR DETERMINING PH VALUE AT SUPER HIGH TEMPERATURES

BACKGROUND OF THE INVENTION

This invention relates to a glass electrode suitable for determination of pH values particularly at elevated temperatures (in the range of about 100° to 150° C., and hereinafter referred to as "super high temperatures"). The electrode is formed by fusing a glass mixture of a special composition and then molding the melt to a shape.

In order to carry out the determination of pH values at high temperatures in a stabilized manner, a glass electrode to be used must meet at least the following requirements.

1. The electromotive force per unit pH value of the pH-responsive membrane should not drop.
2. The internal resistance should not increase materially.
3. The potential difference of pH 7 of the pH-responsive membrane should not vary beyond the range of permissible error.

Without meeting these three requirements no glass electrode can perform the pH determination satisfactorily at elevated temperatures.

Ordinary glass electrodes for determining pH values at elevated temperatures are capable of serving the purpose in the temperature range of 40° to 100° C. at most, as specified in the Japanese Industrial Standards Z8805. Moreover, conventional pH-responsive glass membranes are usually short-lived when used in the determination at temperatures close to 100° C. for an extended period of time, the service life under such condition being 10 to 15 days at best and in many cases only 2 or 33 days, depending on the types of the test specimens to be encountered.

BRIEF SUMARY OF THE INVENTION

The glass electrode made from the composition according to the invention for the pH determination satisfies all of the three conditions given above. The invention thus provides a glass electrode which is capable of pH determination over an extended period of time with high degree of stability, accuracy, and reliability, not only in the usual high temperature range of 40° to 100° C. but also in such a super high temperature range of 100° to 150° C. where existing glass electrodes have been of no use.

Further explanation will be made of the three requirements hereunder. First, any drop of the electromotive force per pH unit (mV/pH) would naturally lead to an error in the determined value. In addition, it would render the adjustment of the pH meter with a standard solution impossible. For these reasons, the characteristic is one of the most important ones which govern the life of a pH-determining glass electrode. Second, an excessive increase in the resistivity of a pH-responsive glass membrane, for instance, up to 20 to 100-fold, on the use of the electrode at a high temperature for a lengthy period of time causes an extreme slowdown in the pH response of the glass membrane. It is often the case with the conventional glass electrodes that a period of 10 minutes to more than one hour is required before a mV/pH value which permits adjustment of the pH meter is obtained.

Especially with the rise of temperature, the resistivity of the pH-responsive membrane drops in a logarithmic relationship and, it matters rather little if the value remains within the range of permissible error. As a matter of fact, however, the adjustment of a pH meter is in many cases accomplished at normal temperatures, say between 20° and 30° C. and particularly a slow response makes accurate adjustment of the instrument difficult and leads to a serious error in pH determination.

Third, stability of the potential difference at pH 7 is an important factor which governs whether a determined value represents exactly what has been determined throughout the determination period, from the start till the finish. If it has moved either way (to the positive or negative side), it is supposed that the determined value per se should have that much made a horizontal shifting. In this sense, it is another factor which cannot be overlooked.

Thus, the three factors given above are essential requirements which must be met in order to make the pH determination at super high temperatures feasible.

The present invention pertains to a composition of glass electrode membrane for pH determination which satisfies the above three conditions and is capable of the determination in the practically useful ranges, i.e., in the temperature range of 0 to 150° C. and in the pH range of 0 to about 13. The present inventor, after an integrated, systematic study of the composition of pH-responsive glass membrane, has successfully fabricated a glass electrode for pH determination, which is capable of determining pH values particularly at super high temperatures for a lengthy period of time.

The pH-responsive glass membrane according to this invention is obtained by preparing a batch comprising as essential constituents 50–70 percent (by weight, the same applying hereinafter), $SiO_2$, 10–20 percent $Li_2O$, 7–20 percent $BaO$, and 3–10 percent $UO_3$, and, if desired 0–5 percent of an oxide or a mixture of two or more oxides selected from the group consisting of $NiO$, $Nd_2O_3$, $La_2O_3$, $Cr_2O_3$, $ThO_2$, $ZrO_2$, $TiO_2$, $MnO_2$, $Co_3O_4$, $Ta_2O_5$ and $Nb_2O_5$, fusing the batch to a melt, and then fabricating a glass electrode for pH determination using a pH-responsive membrane formed of said melt.

The reasons for which the compositional ranges of the constituents of the glass electrode according to the invention are specified as above are given below.

If the $SiO_2$ content of the composition is less than 50 percent, the internal resistance will rise sharply and the potential difference at pH 7 will vary widely. Conversely if it is more than 70 percent, the resistivity of the resulting pH-responsive member will be high (over 1000 megohms at 25° C.), both to practical disadvantage. Moreover the glass electrode thus obtained has an expansion coefficient different from that of the supporting glass shaft. If the $Li_2O$ content is less than 10 percent, the electromotive force per pH unit will be narrowly rectilinear and what is called alkali error will be large. If it exceed 20 percent, the glass product will have poor stability as such, with inadequate resistance to acids and a tendency to be devitrified. A BaO content of less than 7 percent will cause an increase in the alkali error, and a content of more than 20 percent will lead to an excessive rise of the resistivity of the pH-responsive membrane. If $UO_3$ is less than 3 percent, the potential difference at pH 7 will become highly variable, and if it exceeds 10 percent, the expansion coefficient of the product will not conform to that of the supporting glass shaft.

$NiO$, $Cr_2O_3$, $MnO_2$ and $Co_3O_4$ are all effective in improving the physical properties (i. e., expansion coefficient and mechanical strength) of the pH-responsive glass membrane, but if any of it or a mixture thereof exceeds the singular or combined proportion of 5 percent it will act to the contrary or may result in a decrease of the electromotive force per pH unit.

$Nd_2O_3$, $La_2O_3$ and $ThO_2$ are invariably helpful in increasing the stability of the pH-responsive membrane, but an amount of greater than 5 percent of them will lead to an increased internal resistance or a departure of the expansion coefficient of the membrane out of agreement with that of the supporting glass shaft. $ZrO_2$ and $TiO_2$ Contribute to the chemical resistance of the product but an amount of more than 5 percent of them will give the membrane an expansion coefficient unlike that of the glass shaft, and will also raise the internal resistance. $Ta_2O_5$ and $Nb_2O_5$ have inhibitive effects upon the variation of pH 7 potential difference and improve the workability of glass. However, more than 5 percent of these oxides will again afford the product an expansion coefficient different from that of the glass shaft.

A glass electrode for pH determination which incorporates a pH-responsive film formed of the glass composition in accordance with the invention permits continuous determination of pH values at super high temperatures. This has never been possible with conventional instruments. It can stand continuous use at such elevated temperatures and is quicker to respond to a given pH condition than any glass electrode of prior design. Furthermore, it exhibits greater electromotive force per pH unit and has a smaller increment of internal resistance and less shifting of pH-7 potential. In other words, even in determination of a pH value where the test specimen is at a super high temperature, a rectilinearity of the electromotive force per pH unit is broad and the value is the closest possible to one calculated on the basis of the Nernst equation. It is further possible with the present electrode to limit the variation of pH-7 potential difference (principally the true asymmetrical potential difference of the pH-responsive membrane) within a certain range of permissible error, without inducing any increase in the resistivity of the pH-responsive membrane.

BRIEF DESCRIPTION OF THE DRAWINGS

The figures of the drawing represent graphs showing the results of comparative tests of glass electrodes according to the present invention and of conventional designs, FIGS. 1 to 3 specifically illustrate changes of electromotive force with pH.

DETAILED DESCRIPTION OF INVENTION

Now, referring to the accompanying drawings, glass electrodes for pH determination formed of the glass composition according to the present invention and also of the conventional design will be compared hereunder in terms of characteristics.

Figure 1:
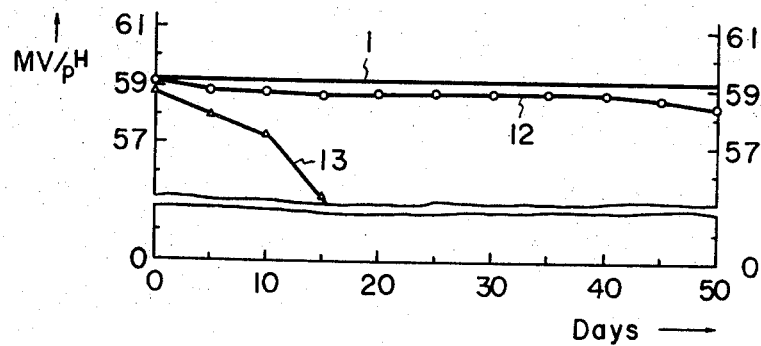
Figure 2:
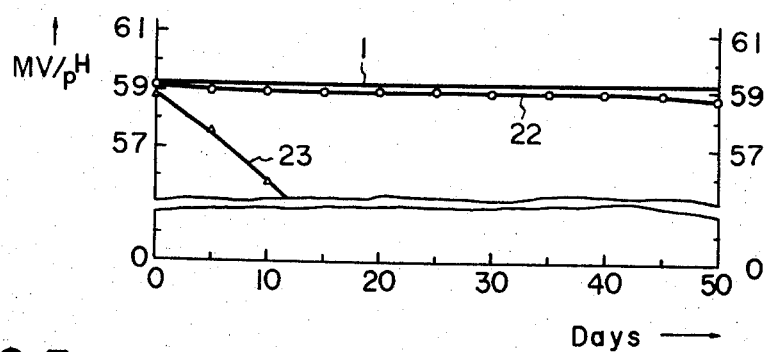
Figure 3:
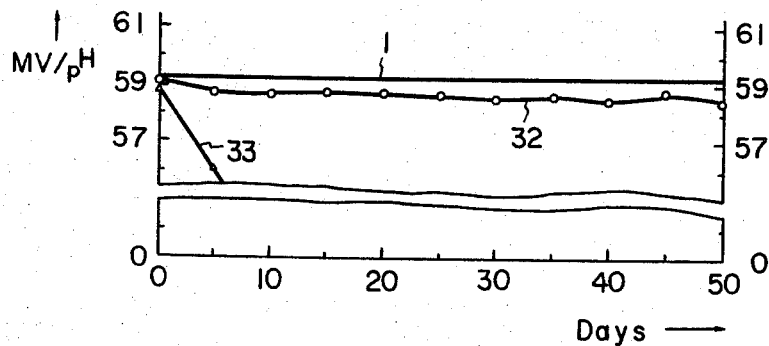

Characteristic requirements for stable determination of pH values at elevated temperatures have already been discussed. It will also be appreciated that, as stated, a glass electrode for pH determination formed of the glass composition according to the present invention meets all of the above three requirements. In the appended drawings, FIGS. 1 through 7 show the results of actual determination of pH values at 25° C. with test electrodes after being heated to 130° C. FIGS. 1 to 3 represent comparisons of electromotive force of pH-determining glass electrodes of the present invention and of prior design, all indicating that when using the glass electrode of the present invention there occurs no reduction of the electromotive force per pH unit of the pH-responsive membrane at super high temperatures. In these graphs are given the degrees of deterioration of electromotive force per pH unit of the test electrodes upon immersion in service water (FIG. 1), in an acidic solution of pH 4 standard buffer solution in the form of a 0.05 mol phthalate solution (FIG. 2), and in an alkaline solution of pH 9 standard buffer solution in the form of a 0.01 mol borax solution (FIG. 3).

Throughout FIGS. 1 to 3, line 1 designates the value calculated on the basis of the Nernst equation.

Lines 12, 22 and 32 in FIGS. 1, 2 and 3, respectively, represent the degrees of degradation of electromotive force with a glass electrode of the glass composition according to the present invention.

Lines 13, 23 and 33 in FIGS. 1, 2 and 3, respectively, represent the comparable values with a glass electrode of conventional design.

As can be seen from these graphs, the glass electrode of the present invention is capable of measurement in service water and the acidic and alkaline solutions at temperatures three to five times as high as the temperatures which can be endured by the ordinary electrode.

Figure 4:
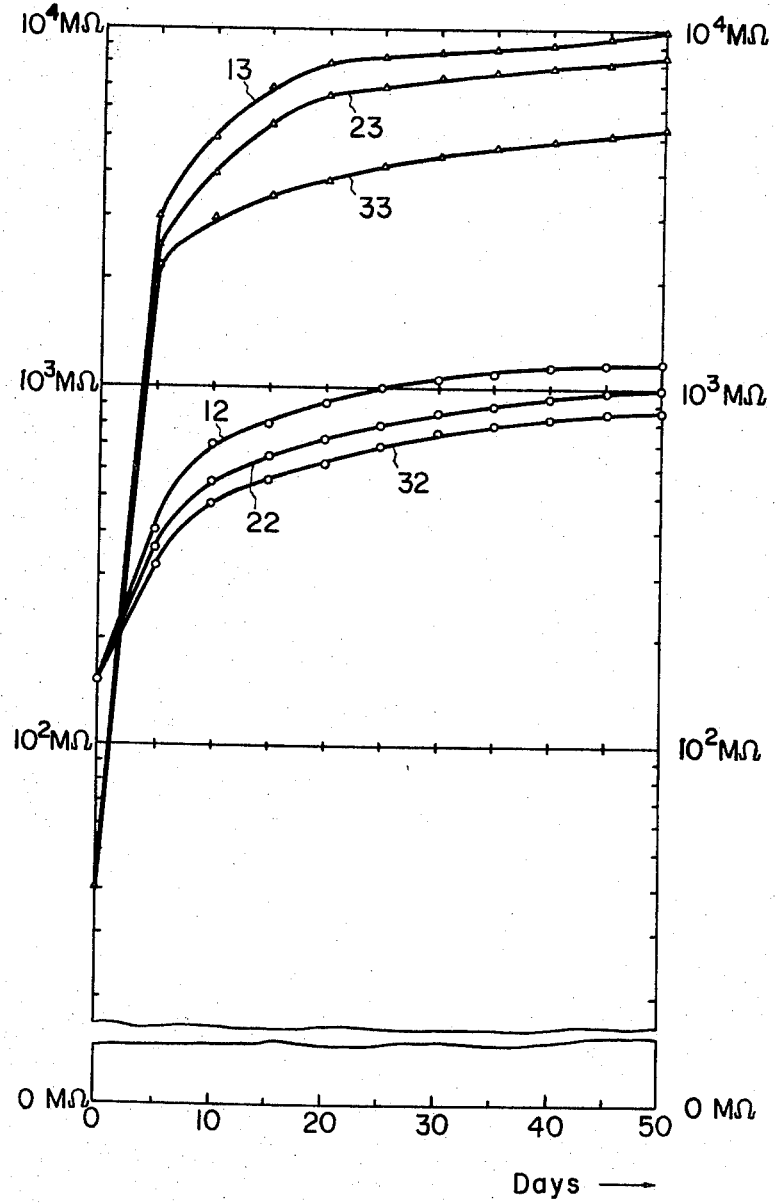
FIG. 4 shows changes of internal resistance.

In FIG. 4 there is made a comparison of internal resistance values of the glass electrodes after use at a super high temperature for a lengthy period of time. The electrodes were tested under the conditions given FIGS. 1 to 3 and then their internal resistance values at 25° C. were determined.

In FIG. 4, line 12, 22 and 32 represent variation of internal resistance values at 25° C. of the electrode of the invention after the test of respectively service water, acidic solution and alkaline solution and line 13, 23 and 33 represent that of the electrode of a prior design after the test of service water, acidic solution and alkaline solution in the same manner.

As will be noted from FIG. 4, the electrode of the invention displays at most about a 10-fold increase in the internal resistance value, to remarkable advantage, as compared with the approximately 80 to 100-fold increase in the conventional electrode.

Figure 5:
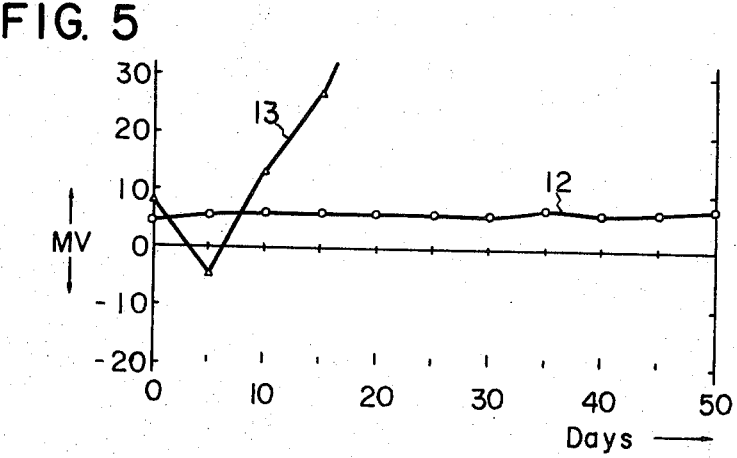
FIGS. 5 to 7 show changes of pH-7 potential difference.
Figure 6:
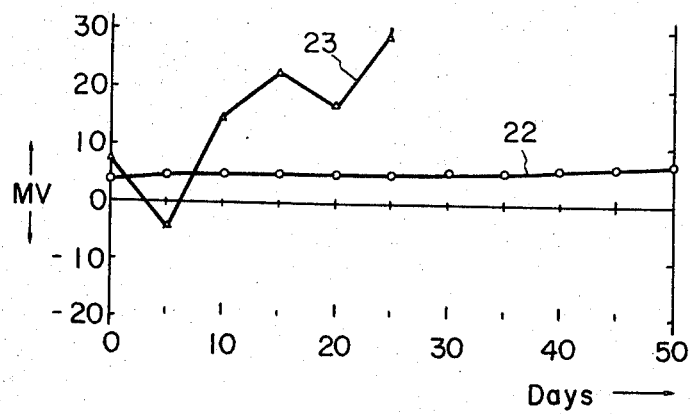
Figure 7:
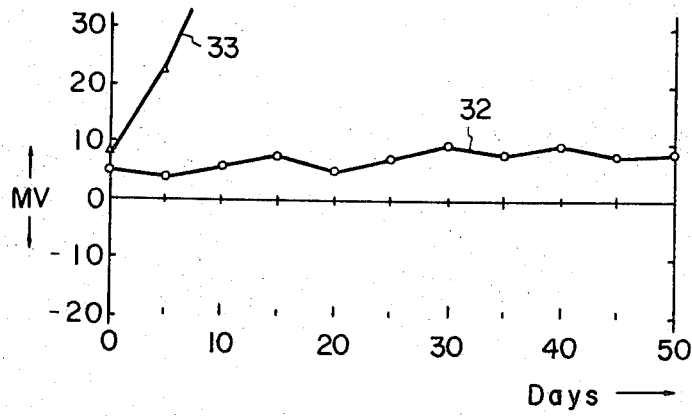

FIGS. 5 to 7 show comparisons of changes of pH-7 potential difference of pH-responsive membrane, which correspond to the data given in FIG. 1 to 3, respectively. It should be noted, however, that the changes in the pH-7 potential difference include changes of the true asymmetrical potentials of the pH-responsive membranes, of the potential of inner poles of the glass electrodes, and also the changes in pH of the solutions inside the glass electrodes. In FIG. 5, line 12 and 13 represent changes of pH-7 potential difference of pH-response membrane respectively of the electrode of the invention and that of the prior design both after the test of service water, and in FIG. 6, line 22 and 23 represent that of the electrode of the present invention and the electrode of a prior design respectively after the test of acidic solution, and in FIG. 7, line 32 and 33 show, in the same manner, that of the electrode of the invention and of a prior design after the test of alkaline solution.

As will be manifest from FIG. 5 to 7, the pH-determining glass electrode according to the present invention is superior to the conventional one in the changes of pH-7 potential difference of the pH-responsive membrane. Especially in the test with an alkaline solution at 130° C. (FIG. 7), the electrode of the invention showed changes within the permissible range in contrast to the ordinary electrode which showed changes with extreme directionality.

Although not shown in the accompanying drawings, concerning the rate of response of the electrode to a given pH state, further test showed that the pH-determining glass electrode of the glass composition according to the present invention responded in such a way that, when the electrode was immersed in pH standard solutions (standard buffer solutions with different pH values of 4, 7 and 9), the readings were always stabilized within 60 seconds. Drifts of the readings five minutes later were well within the range of plus or minus two millivolts as compared with readings obtained after 60 seconds. On the other hand, the conventional electrode gave readings with poor stability, even after 1 hour's immersion in the same pH standard solution.

Examples of the chemical composition of pH-responsive membranes for the pH-determining glass electrode according to the present invention are tabled below.

TABLE 1-1

| Example | 1 | 2 | 3 | 4 | 5 | 6 | 7 |
|---|---|---|---|---|---|---|---|
| $SiO_2$ | 55.5 | 56.0 | 56.7 | 56.7 | 57.2 | 58.3 | 58.9 |
| $Li_2O$ | 18.0 | 12.9 | 11.0 | 11.6 | 13.0 | 14.5 | 13.3 |
| BaO | 16.0 | 19.6 | 19.4 | 19.7 | 16.4 | 14.6 | 16.2 |
| $UO_3$ | 6.2 | 6.5 | 7.9 | 7.0 | 8.7 | 7.6 | 7.6 |
| NiO | — | — | — | — | — | — | — |
| $Nd_2O_3$ | — | 3.0 | 3.4 | 3.1 | — | — | — |
| $La_2O_3$ | — | — | 1.5 | 1.9 | — | — | 4.0 |
| $Cr_2O_3$ | — | — | — | — | — | — | — |
| $ThO_2$ | — | — | — | — | — | 3.9 | — |
| $ZrO_2$ | 1.0 | 2.0 | — | — | 4.6 | — | — |
| $TiO_2$ | 2.3 | — | — | — | — | 1.1 | — |
| $MnO_2$ | — | — | — | — | — | — | — |
| $Co_3O_4$ | 1.0 | — | 0.1 | — | 0.1 | — | — |
| $Ta_2O_5$ | — | — | — | — | — | — | — |
| $Nb_2O_5$ | — | — | — | — | — | — | — |
| Electromotive force/pH at 25°C. (mV/pH) | 58.90 | 59.00 | 59.00 | 59.05 | 59.00 | 58.80 | 59.00 |
| Change of internal resis. after test | upto 11.0 -fold | upto 11.0 -fold | upto 10.0 -fold | upto 9.5 -fold | upto 9.5 -fold | upto 10.0 -fold | upto 9.5 -fold |
| Change of pH-7 potential after test (mV) | ±6.5 | ±5.5 | ±4.0 | 6.0 | ±6.5 | ±5.0 | ±4.5 |
| pH determination range (pH) | 0-13.0 | 0-12.5 | 0-13.0 | 0-13.0 | 0-13.0 | 0-13.0 | 0-13.0 |
| Useful temp. range (°C.) | 0-140 | 0-150 | 0-140 | 0-150 | 0-150 | 0-145 | 0-150 |
| No. of days serviceable at 130°C. | 45 | 50 | 45 | 50 | 50 | 45 | 50 |

TABLE 1-2

| Example | 8 | 9 | 10 | 11 | 12 | 13 | 14 |
|---|---|---|---|---|---|---|---|
| $SiO_2$ | 59.2 | 60.2 | 60.4 | 60.7 | 61.2 | 61.7 | 62.3 |
| $Li_2O$ | 11.6 | 11.5 | 11.0 | 14.0 | 11.7 | 12.3 | 12.7 |
| BaO | 15.7 | 16.5 | 15.6 | 16.2 | 16.7 | 16.9 | 16.9 |
| $UO_3$ | 9.4 | 8.8 | 8.0 | 8.0 | 8.9 | 9.1 | 7.8 |
| NiO | — | — | — | — | — | — | 0.3 |
| $Nd_2O_3$ | — | — | — | — | — | — | — |
| $La_2O_3$ | 3.0 | — | 4.8 | — | — | — | — |
| $Cr_2O_3$ | — | — | — | 1.1 | — | — | — |
| $ThO_2$ | — | — | — | — | — | — | — |
| $ZrO_2$ | — | — | — | — | — | — | — |
| $TiO_2$ | — | — | — | — | — | — | — |
| $MnO_2$ | — | 0.4 | — | — | 0.5 | — | — |
| $Co_3O_4$ | — | — | 0.2 | — | — | — | — |
| $Ta_2O_5$ | — | 2.6 | — | — | 1.0 | — | — |
| $Nb_2O_5$ | 1.1 | — | — | — | — | — | — |
| Electromotive force/pH at 25C. (mV/pH) | 58.85 | 58.90 | 59.10 | 59.00 | 59.05 | 58.95 | 58.90 |
| Change of internal resis. after test | upto 10.0 -fold | upto 10.0 -fold | upto 10.5 -fold | upto 9.5 -fold | upto 9.0 -fold | upto 10.5 -fold | upto 10.0 -fold |
| Change of pH-7 potential after test (mV) | ±5.0 | ±3.0 | ±4.0 | ±4.5 | ±3.0 | ±6.5 | ±6.0 |
| pH determination range (pH) | 0-12.5 | 0-12.5 | 0-13.0 | 0-13.0 | 0-13.0 | 0-12.5 | 0-12.5 |
| Useful temp. range (°C.) | 0-015 | 0-150 | 0-145 | 0-150 | 0-150 | 0-140 | 0-145 |
| No. of days serviceable at 130°C. | 50 | 50 | 45 | 50 | 50 | 40 | 45 |

TABLE 1-3

| Example | 15 | 16 | 17 | 18 | 19 | 20 |
|---|---|---|---|---|---|---|
| $SiO_2$ | 63.3 | 63.8 | 65.7 | 66.3 | 68.2 | 68.8 |
| $Li_2O$ | 11.5 | 15.2 | 12.0 | 12.8 | 14.6 | 17.0 |
| BaO | 13.5 | 10.9 | 8.5 | 12.5 | 10.9 | 9.5 |
| $UO_3$ | 7.8 | 6.5 | 9.6 | 4.6 | 3.5 | 4.0 |
| NiO | — | — | — | — | — | — |
| $Nd_2O_3$ | — | — | — | — | — | — |
| $La_2O_3$ | — | — | — | — | — | — |
| $Cr_2O_3$ | — | — | 0.5 | — | — | — |
| $ThO_2$ | — | — | — | 3.8 | — | — |
| $ZrO_2$ | 3.8 | — | — | — | — | — |
| $TiO_2$ | — | — | — | — | 2.8 | 0.6 |
| $MnO_2$ | — | — | — | — | — | — |
| $Co_3O_4$ | — | — | — | — | — | — |
| $Ta_2O_5$ | — | 3.6 | — | — | — | — |
| $Nb_2O_5$ | 0.4 | — | 3.7 | — | — | — |
| Electromotive force/pH at 25°C. (mV/pH) | 58.95 | 58.75 | 58.80 | 59.10 | 58.88 | 58.90 |
| Change of internal resis. after test | upto 9.0 -fold | upto 9.5 -fold | upto 9.0 -fold | upto 9.5 -fold | upto 8.5 -fold | upto 8.5 -fold |
| Change of pH-7 Potential after test (mV) | ±4.0 | ±3.0 | ±3.0 | ±6.0 | ±4.0 | ±5.0 |
| pH determination range (pH) | 0-12.0 | 0-12.0 | 0-12.0 | 0-12.5 | 0-12.0 | 0-12.0 |
| Useful temp. range (°C.) | 0-150 | 0-150 | 0-150 | 0-150 | 0-150 | 0-150 |
| No. of days serviceable at 130°C. | 50 | 50 | 50 | 50 | 50 | 50 |

According to the present invention, a composition prepared as exemplified in the table is fused at about 1,400° C. to form a glass which is then shaped and attached to one end of an electrode-supporting glass tube.

A pH-determining glass electrode formed of a glass film of the composition obtained in accordance with the present invention has the outstanding features as described hereinabove.

The electrode of the invention is therefore adapted for the determination of pH values in such processes where continuous pH determination a super high temperatures is required, or in fermentation plants, or in such plants where sterilizing processes as by superheated steam at 1302 C. are involved.

What I claim and desire to secure by Letters Patent is:

1. A glass electrode for determining pH values at a temperature of 100° to 150°C comprising a pH-responsive membrane formed of a mixture consisting essentially of 50–70 percent $SiO_2$, 10–20 percent $Li_2O$, 7–20 percent BaO, and 3–10 percent $UO_3$.

2. A glass electrode in accordance with claim 1, in which said pH-responsive glass membrane is attached to an electrode-supporting glass tube.

3. A glass electrode for determing pH values at a temperature 100° to 150° C comprising a pH-responsive membrane formed of a mixture consisting essentially of 50–70 percent $SiO_2$, 10–20 percent $Li_2O$ 7–20 percent BaO, 3–10 percent $UO_3$, and up to 5 percent of at least one oxide selected from the group consisting of NiO, $Nd_2O_3$, $Cr_2O_3$, $ThO_2$, $La_2O_3$, $ZrO_2$, $TiO_2$, $MnO_2$, $Co_3O_4$, $Ta_2O_5$, and $Nb_2O_5$.

4. A glass electrode in accordance with claim 3, in which said pH-responsive glass membrane is attached to an electrode-supporting glass tube.

5. A method of measuring the pH value of fluid at a temperature of 100° to 150° C comprising contacting said fluid at said temperature with a glass electrode having a membrane of a composition consisting essentially of 50–70 percent $SiO_2$, 10–20 percent $Li_2O$ 7–20 percent BaO, and 3–10 percent $UO_3$ and determining the electromotive force produced by said electrode.

6. A method of measuring the pH value of a fluid at a temperature of 100° to 150° comprising contacting said fluid at said temperature with a glass electrode having a membrane composition consisting essentially of 50–70 percent $SiO_2$, 10–20 percent $Li_2O$, 7–20 percent BaO, 3–10 percent $UO_3$ and up to 5 percent of at least one oxide selected from the group consisting of NiO, $Nd_2O_3$, $Cr_2O_3$, $ThO_2$, $La_2O_3$, $ZrO_2$, $TiO_2$, $MnO_2$, $Co_3O_4$, $Ta_2O_5$, and $Nb_2O_5$, and determining the electromotive force produced by said electrode.

* * * * *